April 25, 1961     J. C. LINCOLN     2,981,318
SPRING CUSHION
Filed Sept. 6, 1957
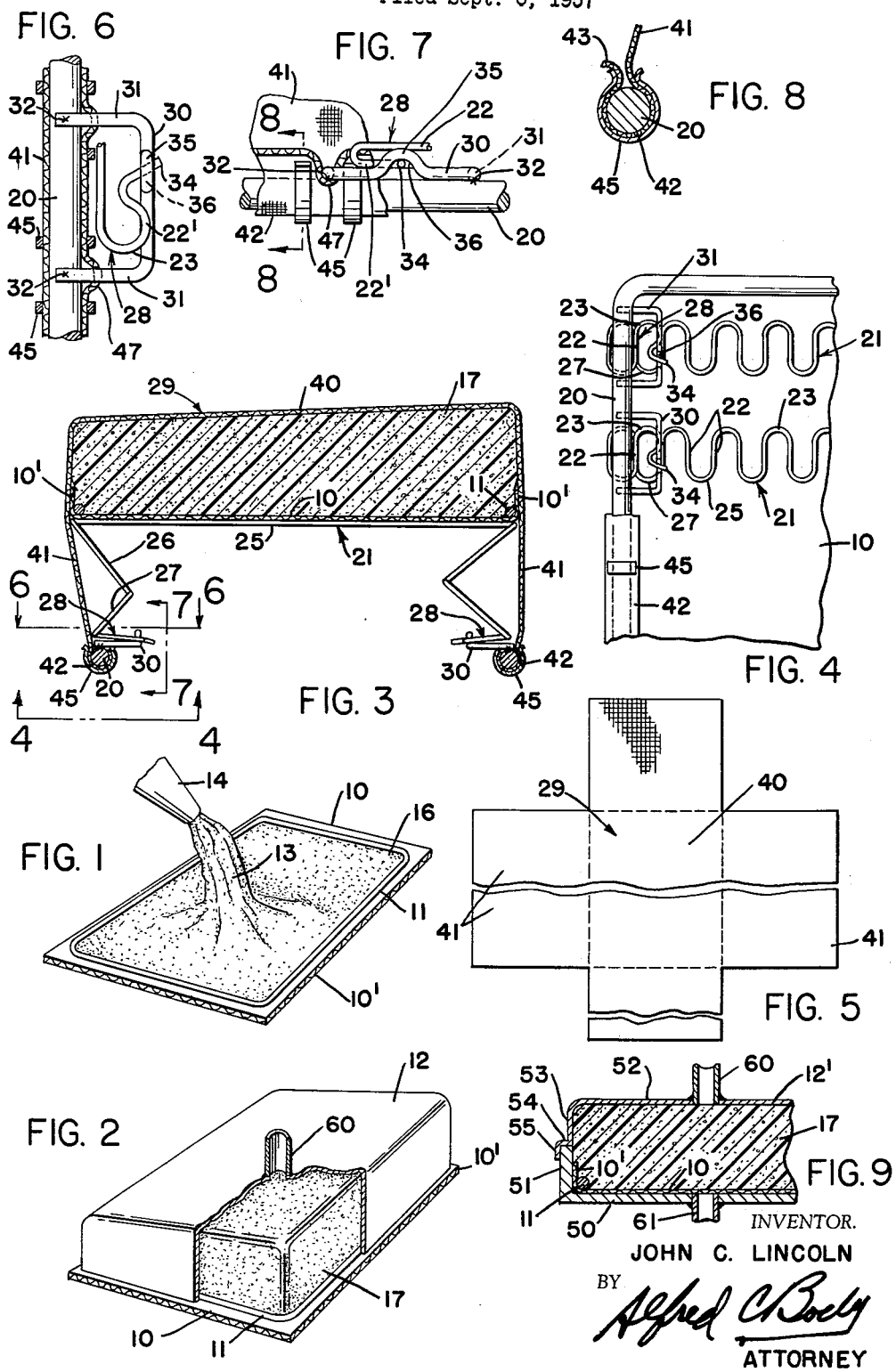
INVENTOR.
JOHN C. LINCOLN
BY Alfred C. Boely
ATTORNEY

United States Patent Office 2,981,318
Patented Apr. 25, 1961

2,981,318

SPRING CUSHION

John C. Lincoln, Cleveland, Ohio, assignor, by mesne assignments, to Hoover Ball and Bearing Company, Bedford, Ohio, a corporation of Michigan Filed Sept. 6, 1957, Ser. No. 682,374

8 Claims. (Cl. 155—179)

This invention pertains to the art of furniture and more particularly to a spring cushion or back therefor and the method of making same.

The invention is particularly applicable to spring cushions or backs for automobiles and will be described with particular reference thereto, although it will be appreciated that the invention has broader applications.

Further, while the invention is equally applicable to the spring backs, it will only be described with reference to the seat cushion.

In the art of manufacturing seat cushions for automobiles, one of the major problems has been that of cost. To hold or reduce the cost it is necessary to employ the minimum amount of inexpensive materials where possible and to so arrange the parts which make up the cushion so that they may be manufactured and assembled with a minimum amount of labor.

The present invention contemplates and has for its principal object a seat cushion of a general type described which may be manufactured at a minimum cost which employs a minimum amount of expensive materials which may be assembled rapidly and which will be durable.

Another object of the invention is the provision of a new and improved method of making a seat cushion for automobiles and the like which requires a minimum amount of labor.

Another object of the invention is the provision of a new and improved seat cushion which may to a large extent be manufactured by automatic machinery.

Another object of the invention is the provision of a new and improved seat cushion which is simple in construction, provides a maximum amount of springing and is economically manufactured.

The invention in its basic concept attempts to take advantage of the characteristics of certain recently announced sponge-like materials such as the polyurethane foams which can be poured as a liquid, but which will foam and expand to a body made up of thin resilient membranes of the plastic material surrounding a plurality of voids. The invention will be described with particular reference to the polyurethane foams, although it will be appreciated that it is equally applicable to other similar acting materials.

In accordance with the present invention, a block or cushion of polyurethane foam is first formed to a desired shape and dimension. A spring base for such block is also formed and a fabric cover is positioned over the block of foam and around the spring base and fastened thereto so as to hold the base and block in assembled relationship.

The block may be formed in a number of different ways but in certain aspects of the invention, a partial form is provided into which the polyurethane is positioned in a measured amount either before it has commenced to foam or before it has completed its foaming action. Thereafter, the partial form is closed in and the polyurethane is allowed to continue its foaming until the form is filled. Thereafter the block is removed from the form and is assembled with its spring base.

The invention may take physical form in certain parts and arrangements of parts and certain steps and combinations of steps, the preferred embodiments of which will be described in detail in this specification and illustrated in the accompanying drawings which form a part hereof and wherein:

Figure 1 shows the first step wherein the polyurethane foams are dispensed into a partial form;

Figure 2 shows the completed form with the polyurethane completely expanded therein;

Figure 3 is a side cross-sectional view of a completed seat cushion forming a perferred embodiment of the invention;

Figure 4 is a fragmentary view of Figure 3 taken approximately on the line 4—4 thereof and having portions broken away for the purposes of showing the under construction;

Figure 5 is a plan layout of the fabric cover of Figure 3;

Figure 6 is an enlarged fragmentary cross-sectional view of Figure 3 taken at approximately the line 6—6 thereof showing in greater detail the arrangement for assembling the springs with the base frame;

Figure 7 is a view similar to Figure 6 but taken on the line 7—7 of Figure 3;

Figure 8 is a cross-sectional view of Figure 7 taken approximately on the line 8—8;

Figure 9 is a view somewhat similar to Figure 2, but showing an alternative embodiment of the invention.

Referring now to the drawings wherein the showings are for the purpose of illustrating preferred embodiments of the invention only and not for the purposes of limiting same, Figures 1 and 2 show the original steps in the manufacturing of a block or cushion of polyurethane foam in accordance with the invention. Thus, in accordance with the invention, there is first provided a layer of fabric material 10 having an over-all dimension slightly in excess of the side dimensions of the block of urethane foam to be formed. Positioned on top of this material 10 is a rectangular frame of wire 11 which in effect forms a dam to retain the polyurethane foam until the desired amount can be placed on top of the fabric 10 and before a suitable mold cover 12 can be placed thereon. Following the placing of the wire dam 11, polyurethane foam 13 in either the unfoamed condition or in the foaming condition is then dispensed onto the surface of the cloth 10 from a suitable nozzle 14.

The polyurethane foams normally consist of an isocyanate and resin material mixed in a 1 to 3 ratio to make a pre-polymer. Such pre-polymer is subsequently or simultaneously mixed with an emulsifier such as "Witco H–77" manufactured by the Witco Chemical Company, New York 17, New York, a catalyst such as N-methyl morpholine and water. Such prepolymer and the emulsifier catylyst in water in a ratio of 96 to 4 immediately commence to foam when mixed together. Such mixing may occur immediately before the materials reach the nozzle 14 and they are commencing to foam as they are dispensed from the nozzle 14. A measured amount of this foaming material 16 is placed on the fabric 10. Such material foams slowly and depending upon the exact mix and the temperature of the ingredients there is a time period of about 30 seconds in which the mold 12 can be placed in position. However, as soon as the desired amount of foaming material has been placed on the fabric 10, the mold form 12 is immediately placed in position with the lower edges in abutment with the dam in the form of the wire 11.

The mixture above described continues to foam for a period of approximately three minutes. Thereafter, depending upon the temperature, it is allowed to remain in the mold and cure for a period of between 20 minutes to one-half hour. Thereafter, the form 12 may be removed and the material allowed to cure for approximately 24 hours. This curing time may be speeded up by placing the foamed material indicated by the reference character 17 in a heated oven or otherwise subjecting the material to heat.

It is preferred that the fabric 10 and frame 11 be allowed to remain in position during this curing period and preferably such materials form a part of the finished cushion.

Following the above operation, the formed cushion 17 is then assembled with a suitable spring base. In the embodiment of the invention shown, the spring base is comprised of a lower rectangular frame of wire or the like 20 having mounted thereon a plurality of spring members 21 which extend above the base frame 20 and transversely from one side to the other. These spring members 21 may take a number of different forms, but in the preferred embodiment, are comprised of a length of wire in a generally sinuous form, as shown in Figure 4, having generally parallel side portions 22 joined by arcuate end portions 23. As such, the wire is formed into an elongated length of spring-like member. Such length is then folded generally into the form shown in Figure 3 having a central portion 25 and end portions consisting of a downwardly and inwardly inclined portion 26 terminating in an outwardly and downwardly inclined portion 27 in turn terminating in an inwardly and downwardly inclined portion 28.

The downwardly inclined portion 28 may be fastened to the lower frame 20 in any suitable manner, but in the preferred embodiment, is cooperatively engaged with a U-shaped frame consisting of a base 30 and a pair of parallel legs 31, the ends of which are spot-welded as at 32 to the upper surface of the base frame 20. The U frame as shown is generally horizontal.

The end side portion 22' of the downwardly extending portion 28 rests on the upper surface of the base 30 and terminates generally midway of the side in an inwardly extending portion 34 which extends under a reversely bent portion 35 of the base 30. The reversely bent portion 35 thus forms a space 36 through which the portion 34 may extend.

As will be seen, the fabric cover, generally indicated at 29, bears against the outer end of the spring portion 28 slightly compressing this portion so as to insure that the portion 34 will remain in assembled relationship under the reversely bent portion 35.

Furthermore, the total spacing of the portions 22' at the opposite ends of the spring 21 are so spaced before assembly with the base frame 20 such that there will be a slight inward pressure of the portions 22' against the base 30 which will also assist in holding the spring 21 in assembled relationship with the base frame 20 prior to positioning of the fabric over the final assembly.

Thus the base frame 20 has a plurality of the U-shaped frames 30 positioned along the pair of opposite sides, one of such U frames 30 for each spring 21 to be employed.

The springs 21 are assembled with a base frame 20 to form a base spring assembly. This base spring assembly is then brought into assembled relationship with the cushion assembly consisting of the foam cushion 17, the frame 11 and the fabric 10. The edges of the fabric 10' extending beyond the frame 11 may be either folded upwardly along the sides of the cushion 17 as shown in Figure 3 or downwardly as desired. In some instances the fabric 10 may be omitted, but it provides a firm base for the lower surface of the foam cushion 17 and its engagement with the upper sides of the springs 21 serving to distribute more equally the weights on the cushion to the springs 21.

The fabric covering 29 and its shape before assembly is shown in Figure 5 and is comprised generally of a central portion 40 having side dimensions generally corresponding to the upper side dimensions of the foam cushion 17 and four sidewardly extending flaps 41 which form the side of the assembled seat cushion and therefore must have a length to reach from the upper surface of the foam cushion 17 to the lower sides of the base frame 20 with an excess for fastening.

Thus the fabric is placed on the upper surface of the foam 17 with the edges of the portion 40 corresponding with the outer upper edges of the foam cushion 17 and the flaps 41 depending downwardly. The lower end of the flaps 41 are then folded around the base frame 20 as at 42 with the free end 43 (see Figure 8) extending above the base frame 20 on the inner side thereof. The spring portions 26, 27 are preferably slightly collapsed during this operation and the end of the flaps 41 are then suitably permanently fastened to the base frame 20. Any suitable means may be employed, but in the preferred embodiment, a U-shaped clip 45 generally of the shape shown, is snapped over the fabric 41 and the base frame 20. A sufficient number of these clips 45 are employed around the entire periphery of the base frame 20 so as to permanently and rigidly fasten the flaps 41 to this base frame. It will be noted that the portion 43 is flexed slightly outwardly as at 47 where it passes under the legs 31 of the U-frame (see Figure 6 and 7). Release of the tension on the spring portions 26, 27 places the bap 41 under tension and holds the fabric in snug tight fitting relationship around the cushion 17, its base 10, the springs 21 and the base frame 20. It is to be noted that the outermost portion of the spring portions 27, 28 in the unbiased state will generally extend slightly beyond the plane of the flaps 41, but the tension of the flaps 41 engage the outer ends of the spring portions 27, 28 to hold the portion 34 in the assembled relationship with the reversely bent portion 35.

Figure 9 shows an alternative embodiment for forming the foam cushion 17. In this embodiment of the invention, the mold or form is made in two parts, namely a base portion having a base 50 with upwardly extending sidewalls 51 forming an upwardly facing cavity into which the fabric layer 10 is positioned with its edge portions 10' extending upwardly at the edges. If desired, the edge portions 10' at the corners may be cut to facilitate this folding without the formation of wrinkles.

Using the apparatus of Figure 9, the foaming plastic 13 in metered amounts is dispensed into the cavity formed by the base 50 and side walls 51. Thereafter a top mold comprised of a top portion 52 and downwardly extending side walls 53 is positioned on the upper ends of the side walls 51. For the purpose of accurately locating this mold 12', the lower ends of the side walls 53 have a horizontally extending flange 54 terminating in a downwardly extending flange 55 of a dimension to locate the upper mold portion 12' on the walls 51. The foaming polyurethane is then allowed to expand and shape itself inside of the mold as described with reference to the embodiments shown in Figures 1 and 2. Thereafter compressed air is admitted through a tube 60 in the top 52 as well as into a tube 61 through the base 50 and the formed cushion 17 is forcibly ejected from the molds and is then ready for assembly into a completed cushion as is shown in Figure 3.

If desired, the fabric 10 may be coated with a suitable material to insure that the foam plastic will adhere to the fabric when the fabric and foam cushion are removed from the mold. In some instances, the fabric 10 may be dispensed with, however.

It will thus be seen that a seat cushion or seat back primarily adaptable for use in automobiles as has been described, which is simple in construction and economically manufactured using a minimum of inexpensive materials and a minimum of labor required in the manufacturing and assembly operation.

Polyurethane foaming plastic and the necessary mixtures required in order to produce a cushion 17 of the required resiliency are well known and form no part of the present invention although insofar as I am aware, I am the first to ever have proposed the use of, and the method of application of, the polyurethane foaming plastics as cushions for furniture and automobile seats and backs.

The invention has been described with reference to preferred embodiments only. Obviously, modifications and alterations differing radically in appearance from the preferred embodiments described will occur to others upon a reading and understanding of this specification and it is my intention to include all such modifications and alterations insofar as they come within the scope of the appended claims.

Having thus described my invention, I claim:

1. A seat cushion comprised of a block of foamed plastic material, a fabric layer attached to the lower surface of said block, spring members extending across the entirety of the lower surface of said fabric and having integral spring members depending from the opposite ends thereof, a frame member connected to the lower ends of said depending portions, a fabric covering over the upper surface of said block and having depending portions extending to said frame and means fastening the lower edges of said fabric to said frame.

2. A seat cushion comprising in combination a block of foamed plastic material, a spring base for said block comprising a rectangular frame spaced from the lower surface of said block, a plurality of spring members extending upwardly from two of the opposite sides of said frame into engagement with the lower surface of said block with each spring member having an integral portion extending across the width of the block from one side of the frame to the other, means fastening said spring members to said frame at the opposite sides thereof, and a fabric member over the upper surface of said block having the edges thereof fastened to said frame.

3. A seat cushion comprising in combination a foamed block of plastic material, a spring base for said block comprised of a rectangular frame spaced from the lower surface of said block, a plurality of integral spring members each having portions extending upwardly in a zig-zag fashion from opposite sides of said frame and a median portion extending transversely across the lower surface of said block between the upwardly-extending portions and means for fastening said spring members to said frame.

4. An automobile seat cushion comprised of a block of resilient material, a spring base for said block comprised of a generally closed loop of formed wire, a plurality of U frames fastened to said closed loop extending generally in the plane thereof, the base of said U frame having generally upwardly extending reversed bent portions, a plurality of spring members each formed from a length of wire bent to a generally sinuous form having sides joined by arcuate portions, the end of each length terminating in a portion resting on the upper side of the base of said U frame and having a bent end extending outwardly under the upwardly reversed bent portion.

5. The combination of claim 4 wherein said cushion and spring base are held in assembled relationship by a fabric layer over the top of the cushion and fastened to said loop.

6. The combination of claim 5 wherein the inwardly extending portion of said length of spring member has an unflexed length greater than the spacing between said fabric and said upwardly bent portion whereby said fabric flexes said spring member to hold the end of the length of spring member in assembled relationship with the base of said U frame.

7. A seat cushion comprising, in combination, a foamed block of plastic material, a spring base for said block comprised of a rectangular frame spaced from the lower surface of said block, a plurality of U-shaped frames fastened to said rectangular frame and disposed generally in the plane thereof, the base of each of said U-shaped frames having a reversely bent portion, and a plurality of spring members each extending upwardly in a zig-zag fashion from said frame and then transversely across the lower surface of said block, each of said spring members being formed from a length of sinuous wire having parallel sides integrally joined by arcuate portions, with the ends of each length of sinuous wire extending with its last parallel side resting on the upper surface of the base of an associated one of said U-shaped frames and its last arcuate portion extending through and under said reversely bent portion.

8. A seat cushion comprising, in combination, a block of foamed plastic material, a spring base for said block comprising a frame member spaced from one surface of said block, a plurality of spring members extending from said frame member and across the entirety of one surface of said block, the opposite ends of each of said spring members having a first integral portion which extends under the frame member and a second integral portion which extends above the frame member with the first and second portions lying in planes extending parallel to the frame member and closely adjacent thereto whereby the spring members will be secured to the frame member, and a fabric covering over the surface of said block opposite said one surface and having flaps folded over the edges of the block and fastened to the periphery of the frame member, with the distance between the block and the frame member being such to partially compress the spring members and hold the flaps in tension, the arrangement being such that the tension thus created will hold said second portions of the spring members in firm engagement with the upper surface of the frame member.

References Cited in the file of this patent

UNITED STATES PATENTS

| | | |
|---|---|---|
| 2,290,614 | Rathbun | July 21, 1942 |
| 2,407,933 | Neely | Sept. 17, 1946 |
| 2,581,761 | Haas | Jan. 8, 1952 |
| 2,657,738 | Kruszona | Nov. 3, 1953 |
| 2,750,996 | Cramer | June 19, 1956 |
| 2,775,287 | Mantegna | Dec. 25, 1956 |
| 2,783,827 | Neely | Mar. 5, 1957 |
| 2,785,440 | Toulmin | Mar. 19, 1957 |